(12) United States Patent
Haeg et al.

(10) Patent No.: US 6,575,031 B2
(45) Date of Patent: Jun. 10, 2003

(54) TRANSDUCER FOR MEASURING DISPLACEMENT OF A VEHICLE SPINDLE

(75) Inventors: Steve R. Haeg, Shorewood, MN (US); Richard A. Meyer, Chaska, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/772,317

(22) Filed: Jan. 26, 2001

(65) Prior Publication Data

US 2002/0100323 A1 Aug. 1, 2002

(51) Int. Cl.$^7$ ............................ G01P 7/00; G01M 17/02
(52) U.S. Cl. ................................. 73/503; 73/146
(58) Field of Search ................. 73/503, 503.3, 73/490, 495, 510, 511, 146, 862.042, 862.043

(56) References Cited

U.S. PATENT DOCUMENTS

| 3,060,733 | A |   | 10/1962 | Herzegh ..................... 73/146 |
| 3,377,849 | A |   | 4/1968  | Lebow ........................ 73/134 |
| 3,618,376 | A |   | 11/1971 | Shull et al. .................. 73/133 |
| 3,693,425 | A |   | 9/1972  | Starita et al. ................ 73/133 |
| 3,771,359 | A |   | 11/1973 | Shoberg .................. 73/141 A |
| 3,780,573 | A |   | 12/1973 | Reus ........................... 73/146 |
| 3,793,890 | A | * | 2/1974  | Anderson et al. ............. 73/490 |
| 3,867,838 | A |   | 2/1975  | Gerresheim ............... 73/133 R |
| 3,939,704 | A |   | 2/1976  | Zipin .......................... 73/133 |
| 4,297,877 | A |   | 11/1981 | Stahl .......................... 73/146 |
| 4,448,083 | A |   | 5/1984  | Hayashi ................... 73/862.04 |
| 4,483,203 | A |   | 11/1984 | Capper .................... 73/862.04 |
| 4,488,441 | A |   | 12/1984 | Ramming ................ 73/862.04 |
| 4,493,220 | A |   | 1/1985  | Carignan et al. ........ 73/862.66 |
| 4,499,759 | A |   | 2/1985  | Hull ............................ 73/146 |
| 4,550,617 | A |   | 11/1985 | Fraignier et al. ........ 73/862.04 |
| 4,573,362 | A |   | 3/1986  | Amlani ..................... 73/862.04 |
| 4,601,206 | A | * | 7/1986  | Watson ........................ 73/510 |
| 4,640,138 | A |   | 2/1987  | Meyer et al. ............ 73/862.04 |
| 4,672,855 | A |   | 6/1987  | Schmieder ............... 73/862.04 |
| 4,748,844 | A |   | 6/1988  | Yoshikawa et al. ........... 73/146 |
| 4,763,531 | A |   | 8/1988  | Dietrich et al. .......... 73/862.04 |
| 4,821,582 | A |   | 4/1989  | Meyer et al. ............ 73/862.04 |
| 4,823,618 | A |   | 4/1989  | Ramming ................ 73/862.04 |

(List continued on next page.)

FOREIGN PATENT DOCUMENTS

| DE | 2 302 540   |   | 7/1974  |
| FR | 2 764 241 A |   | 11/1998 |
| GB | 2 096 777 A |   | 10/1982 |
| JP | 10132570    |   | 5/1998  |
| JP | 11255138    |   | 9/1999  |

OTHER PUBLICATIONS

Milton J. Lebow, "Summer Instrument–Automation Conference and Exhibit—Toronto, Ontario, Canada", Instrument Society of America Conference Preprint, Jun. 5–8, 1961.
G. Hirzinger, "Direct Digital Robot Control Using A Force–Torque–Sensor", IFAC Symposium on Real Time Digital Control Applications, Guadalajara, Mexico, Jan. 15–21, 1983.
Assorted Astek Engineering, Inc. brochures, 1983.

(List continued on next page.)

Primary Examiner—Helen Kwok
(74) Attorney, Agent, or Firm—Westman, Champlin & Kelly, P.A.; S. Koehler

(57) ABSTRACT

A transducer includes a body mountable to a vehicle spindle and a plurality of accelerometers coupled to the body. The plurality of accelerometers measure acceleration of the body. A calculation circuit coupled to the plurality of accelerometers receives output signals therefrom and converts the measured acceleration to displacement signals indicative of displacement of the body in a coordinate system.

12 Claims, 10 Drawing Sheets

U.S. PATENT DOCUMENTS

| | | | |
|---|---|---|---|
| 5,044,201 A | * 9/1991 | Farace et al. | 73/503 |
| 5,065,618 A | 11/1991 | Hodges, Sr. et al. | 73/146 |
| 5,126,641 A | 6/1992 | Putman et al. | 318/128 |
| 5,313,828 A | 5/1994 | Kötzle et al. | 73/146 |
| 5,315,882 A | 5/1994 | Meyer et al. | 73/862.04 |
| 5,400,661 A | 3/1995 | Cook et al. | 73/862.043 |
| 5,440,935 A | 8/1995 | Petersen | 73/765 |
| 5,540,108 A | 7/1996 | Cook et al. | 73/862.041 |
| 5,597,954 A | * 1/1997 | Nakamura | 73/503 |
| 5,969,268 A | * 10/1999 | Sommerfeld et al. | 73/862.041 |
| 5,986,583 A | * 11/1999 | Nakano et al. | 73/490 |

OTHER PUBLICATIONS

A. Rupp, W. Diefenbach, V. Grubisic, "Erfassung der mehraxialen Fahrbetriebsbelastungen mit dem MeBrad 'VELOS'", ATZ Automobiltechnische Zeitschrift 96, 1994, pp. 764–768.

A. Rupp, V. Grubisic, "Reliable and Efficient Measurement of Suspension Loads on Passenger Cars and Commercial Vehicles", reprint from "Advanced Measurement Techniques and Sensory Systems for Automotive Applications: Accuracy and Reliability", Proceedings of the 1st International Conference and Exhibition, Ancona 29–30.6. 1995, Hrsg. ATA Orbassano (1995), S. 263–273.

C. Higashijima, S. Awazu, "Development of multiaxial wheel hub dynamometer", JSAE Review, vol. 16, No. 1, 1/95.

Brochure: Wheel force transducer—the key for real world simulation, Schenck ATC, 4/95.

"Flexible Wheel Force Transducer System for Road Load Data Acquisition", IGEB, 4/95.

Brochure: "Kistler Vehicle Engineering News", 5/97.

Walter Weiblen, Thomas Hofmann, "Evaluation of Different Designs of Wheel Force Transducers", SAE Technical Paper Series, International Congress and Exposition, Feb. 23–26, 1998, pp. 1–10.

TML pam E–670 A: "TML 6–Component Wheel Force Measuring Equipment SLW–A/MFT–106", Texas Measurements, Inc.

"Unique Solutions to Measurement Problems", Robert A. Denton, Inc.

"MMS–6800", Nissho Electric Works, Co. Ltd.

* cited by examiner

TRANSDUCER FOR MEASURING DISPLACEMENT OF A VEHICLE SPINDLE

BACKGROUND OF THE INVENTION

The present invention relates to a transducer that measures displacement along and about three orthogonal axes.

Transducers or load cells for determining forces along and moments about orthogonal axes are known. Two examples of such load cells are disclosed in U.S. Pat. Nos. 4,640,138 and 4,821,582. These transducers have been effective in providing accurate force and moment data acting through a wheel assembly mounted to a vehicle spindle. This data is useful in the design and manufacture of vehicles and/or vehicle systems.

Although current load cells are effective tools, there is a need to obtain further information about the tire and wheel assembly as it travels down a road. In particular, there is a need to provide an improved apparatus and method for measuring displacement of the vehicle spindle, preferably, with respect to six degrees of freedom.

SUMMARY OF THE INVENTION

In order to measure displacement of a vehicle spindle with respect to an orthogonal coordinate system, a body is mounted to the vehicle spindle. A plurality of accelerometers are coupled to the body and provide acceleration signals responsive to acceleration of the body. A calculation circuit is coupled to the plurality of accelerometers and is adapted to receive and convert the acceleration signals to displacement signals. The displacement signals are indicative of displacement of the body, and thus, the vehicle spindle with respect to the orthogonal coordinate system.

Another aspect of the present invention is a method for measuring displacement of a vehicle spindle with respect to an orthogonal coordinate system. A body is mounted to the vehicle spindle. The body includes accelerometers to measure acceleration of the body. Displacement of the body and the vehicle spindle is calculated depending on the measured acceleration.

DETAILED DESCRIPTION OF THE ILLUSTRATIVE EMBODIMENTS

Figure 1:
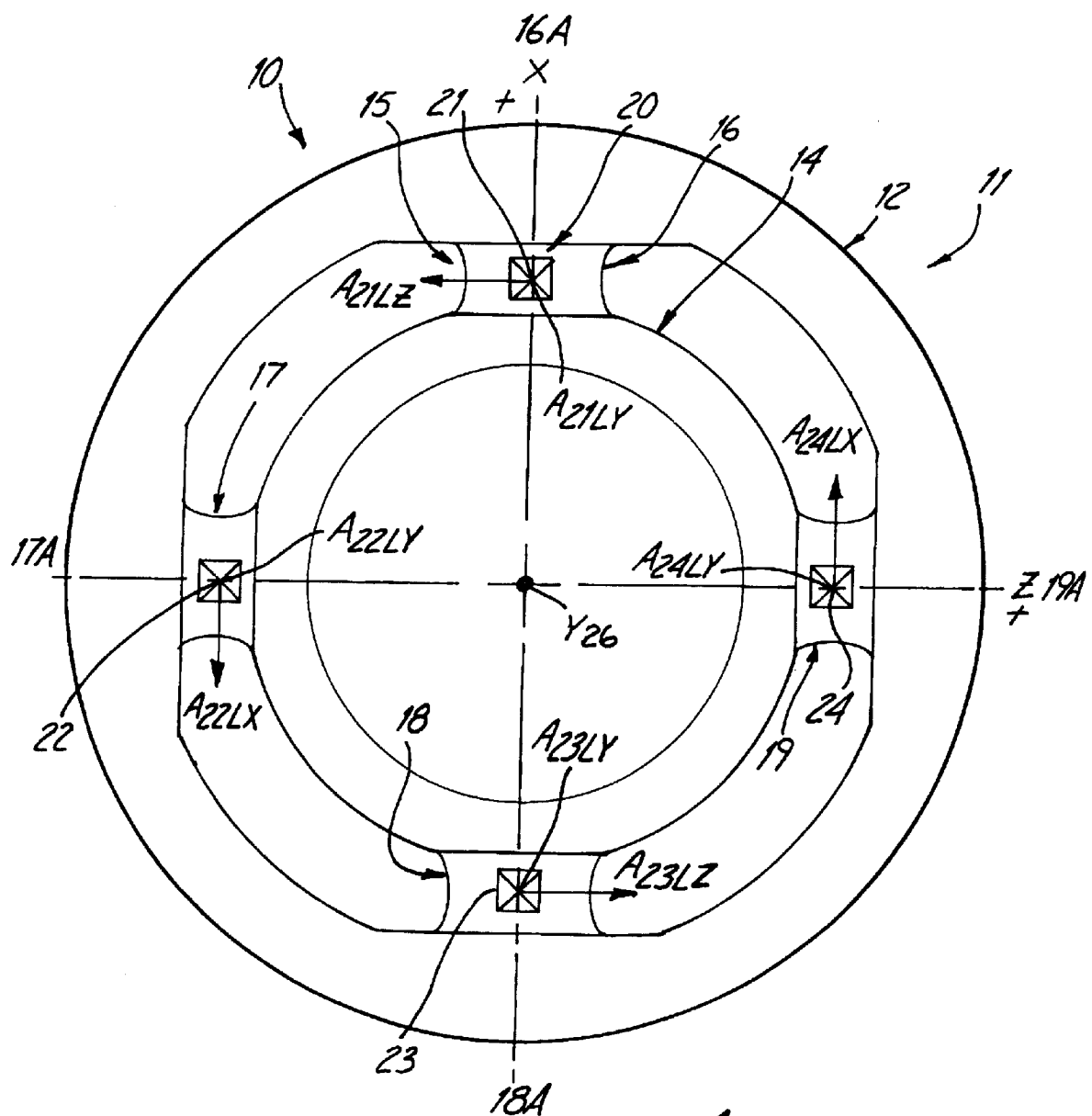
FIG. 1 is a top plan view of an exemplary assembly according to the present invention.

FIG. 1 illustrates an embodiment of an exemplary transducer 10 of the present invention. The transducer 10 includes a body 11 herein comprising by way of example an annular ring 12 and a central hub 14 wherein the annular ring 12 is concentric with the central hub 14. A plurality of radial tubes 15 join the central hub 14 to the annular ring 12. Each of the tubes 16–19 extend radially from the central hub 14 toward the annular ring 12 along corresponding longitudinal axes 16A, 17A, 18A and 19A. Axis 16A is typically aligned with axis 18A, while axis 17A is typically aligned with axis 19A. In addition, axis 16A and 18A are perpendicular to axis 17A and 19A. Although illustrated wherein the plurality of radial tubes 15 equals four, it should be understood that any number of tubes three or more can be used to join the central hub 14 to the annular ring 12. The plurality of radial tubes 15 can be spaced at equal angular intervals about a central axis (axis of rotation) indicated at 26.

Those skilled in the art will further realize that any type of body 11 can be used to practice the present invention. For example, a force transducer such as disclosed in U.S. Pat. No. 5,969,268, entitled "Multi-Axis Load Cell," which is hereby incorporated by reference in its entirety, can be used. Thus, if desired, the body 11 can also be used to measure forces and moments acting on the body 11.

Generally, displacement of the body 11, and thus the vehicle spindle is measured first as acceleration via a plurality of accelerometers 20. In the embodiment illustrated, the accelerometers 20 are grouped in pairs, for instance, pairs of accelerometers 21–24 are mounted on the plurality of tubes 15. Other locations for the pairs 21–24 include the central hub 14 or the annular ring 12. Typically, each of the pairs 21–24 are located at the same radius from the axis of rotation 26. The pairs comprise two accelerometers that measure or sense acceleration typically in directions orthogonal to each other. In the embodiment illustrated, acceleration signals from pairs 21–24 are indicative of acceleration of body 11 in six degrees of freedom.

For purposes of explanation, an orthogonal coordinate system can be defined wherein an X-axis is aligned with the axes 16A and 18A; a Z-axis is aligned with the axes 17A and 19A; and a Y-axis is aligned with central axis 26. Each of pairs of accelerometers 21–24 sense acceleration along two orthogonal directions. By way of example, accelerometer pair 21 comprises two accelerometers that measure or sense acceleration of the body 11 in a direction parallel to the Z-axis (denoted by $A_{21LZ}$) and in a direction parallel to the Y-axis (denoted by $A_{21LY}$) Similar notation is used for pairs 22–24.

Acceleration of body 11, and thus, the vehicle spindle along the X-axis is measured by accelerometer pairs 22 and 24. The acceleration along the X-axis can be represented as:

$$A_{LX} = (A_{24LX} - A_{22LX})/2.$$

Similarly, acceleration along the Z-axis is measured by pairs 21 and 23. Acceleration along the Z-axis can be represented as:

$$A_{LZ} = (A_{23LZ} - A_{21LZ})/2.$$

Acceleration along the Y-axis or central axis 26 is measured by pairs 21–24. The acceleration along the Y-axis can be represented as:

$$A_{LY} = (A_{21LY} + A_{22LY} + A_{23LY} + A_{24LY})/4.$$

Angular acceleration about the X-axis is measured by pairs 22 and 24. The angular acceleration about the X-axis can be represented as:

$$A_{AX} = (A_{24LY} - A_{22LY})/2.$$

Angular acceleration about the Z-axis is measured by pairs 21 and 23. The angular acceleration about the Z-axis can be represented as:

$$A_{AZ}=(A_{23LY}-A_{21LY})/2.$$

Angular acceleration about the Y-axis is measured by pairs 21–24. The angular acceleration about the Y-axis can be represented as:

$$A_{AY}=(A_{22LX}+A_{24LX}+A_{21LZ}+A_{23LZ})/4.$$

It should be understood that the number of pairs 21–24 can be reduced if measured displacement of less than six degrees of freedom is desired. In addition, it is possible to use three pairs of accelerometers (rather than four pairs) to measure acceleration in six degrees of freedom. Although illustrated in this embodiment, the accelerometers 20 are not required to be grouped in pairs proximate each other.

Figure 2:
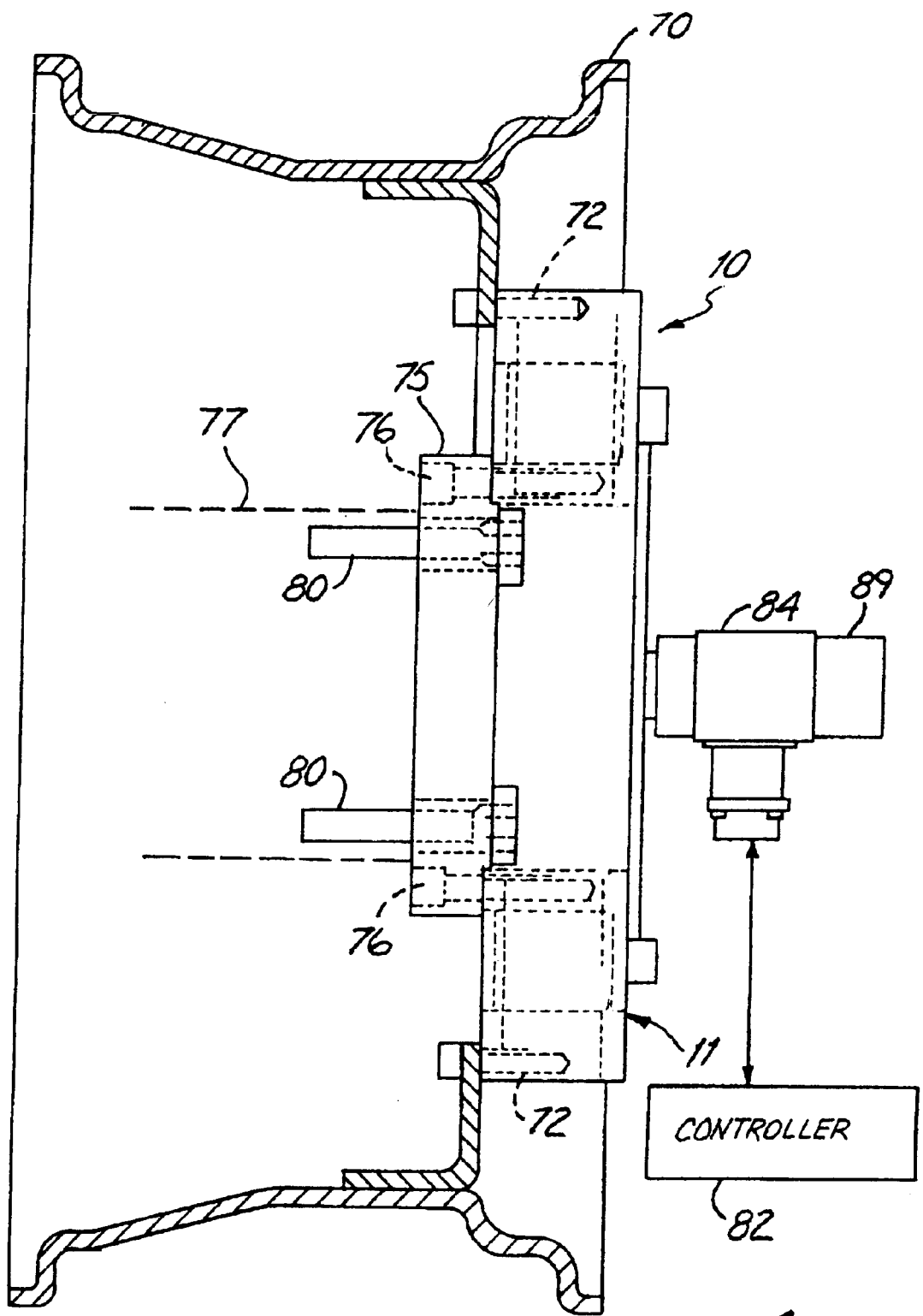
FIG. 2 is a side view of the assembly mounted to a tire rim shown in section.

Referring to FIG. 2, body 11 replaces a center portion of a tire rim 70. Body 11 is secured to a tire rim 70 with fasteners 72. If desired, an adapter plate 75 is fastened to the body 11 using fasteners 76. In turn, the adapter plate 75 is secured on a vehicle spindle 77 using suitable fasteners 80. Output signals from accelerometers 21–24 are coupled to a slip ring assembly 84, if the tire rim 70 rotates or partially rotates. Acceleration signals measured by pairs 21–24 are sent to controller 82. In addition, an encoder 89 provides an angular input signal to the controller 82 indicative of the angular position of body 11.

Figure 3:
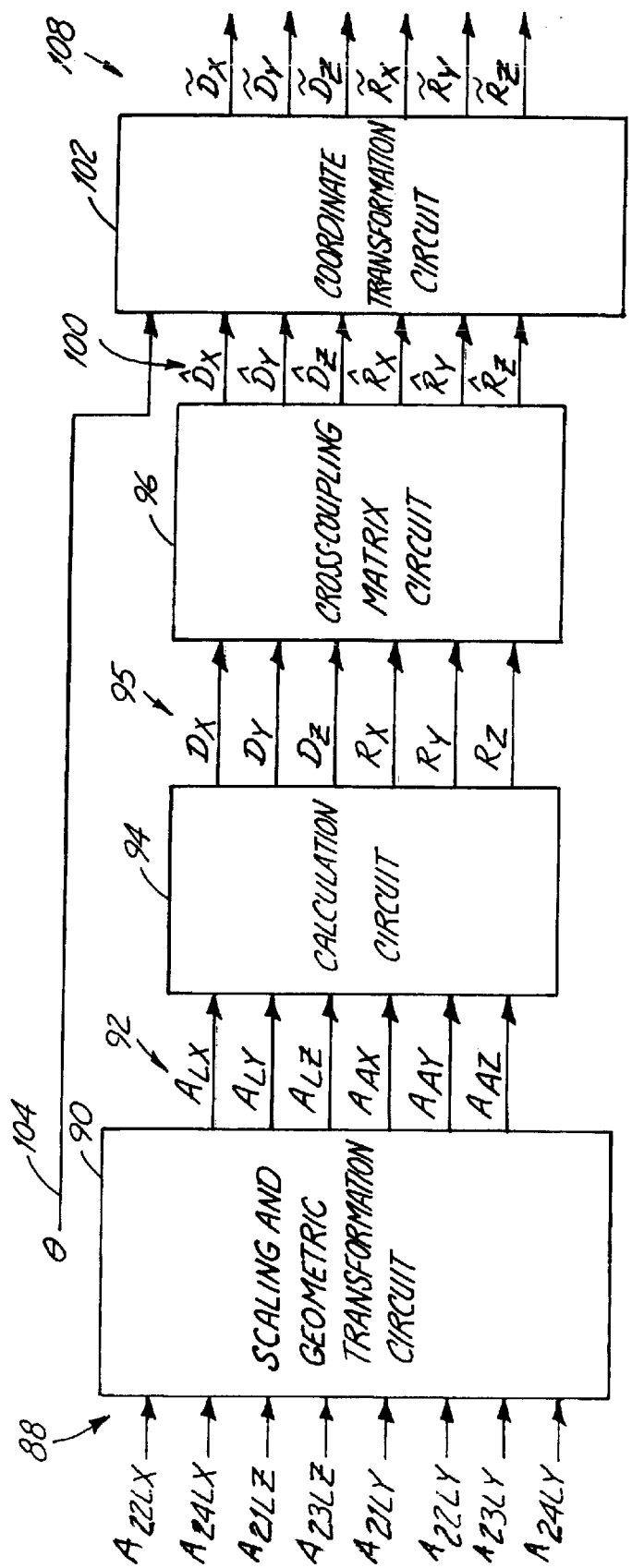
FIG. 3 is a general block diagram of a controller.

FIG. 3 illustrates general operations performed by controller 82 to transform output signals 88 received from eight individual accelerometers from pairs 21–24 to obtain output signals 108 indicative of components of displacement with respect to six degrees of freedom in a static orthogonal coordinate system. As illustrated, output signals 88 from pairs of accelerometers 21–24 are received by a scaling and geometric transformation circuit 90. The scaling and geometric transformation circuit 90 adjusts the output signals 88 to compensate for any imbalance between the accelerometers. Circuit 90 also combines the output signals 88 according to the equations given above to provide output signals 92 indicative of acceleration components with respect to the orthogonal coordinate system.

Calculation circuit 94 receives output signals 92 and calculates displacement components in the orthogonal coordinate system depending on signals 92 received from the scaling and geometric transformation circuit 90. Those skilled in the art will realize that calculation circuit 94 can be used in different locations in order to provide a displacement value given an acceleration value. For example, calculation circuit 94 may be used before scaling and geometric transformation circuit 90 or after cross-coupling matrix circuit 96, discussed below, in order to provide signals indicative of displacement.

In this embodiment, after displacement is calculated, output signals 95 indicative of displacement are sent to cross-coupling matrix circuit 96. Cross-coupling matrix circuit 96 adjusts the output signals so as to compensate for any cross-coupling effect. Then, a coordinate transformation circuit 102 receives output signals 100 from the cross-coupling matrix circuit 96 and an angular input 104 from an encoder or the like. The coordinate transformation circuit 102 adjusts the output signals 100 and provides output signals 108 that are indicative of displacement of body 11, and thus, the vehicle spindle 77, with respect to the static orthogonal coordinate system.

Figure 4:
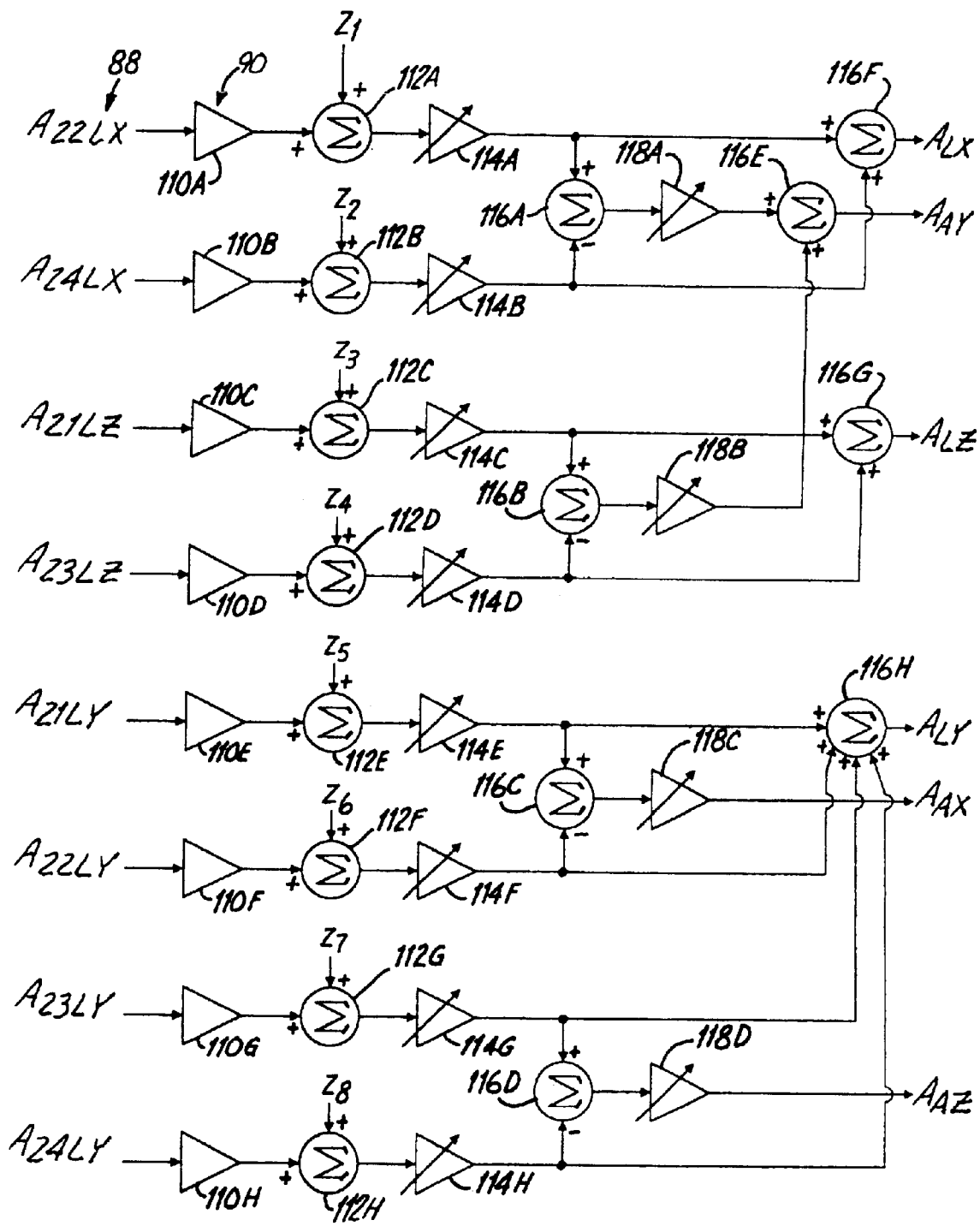
FIG. 4 is a block diagram of a scaling and geometric transformation circuit.

FIG. 4 illustrates the scaling and geometric transformation circuit 90 in detail. High impedance buffer amplifiers 110A–110H receive output signals 88 from slip ring assembly 84. In turn, adders 112A–112H provide a zero adjustment, while adjustable amplifiers 114A–114H individually adjust the output signals 88 so that any imbalance associated with physical differences of body 11 or location of pairs 21–24 can be compensated. Adders 116A–116H combine the output signals from the amplifiers 114A–114H in accordance with the equations above. Adjustable amplifiers 118A–118D are provided to ensure that output signals from adders 116A–116D have the proper amplitude.

Figure 5:
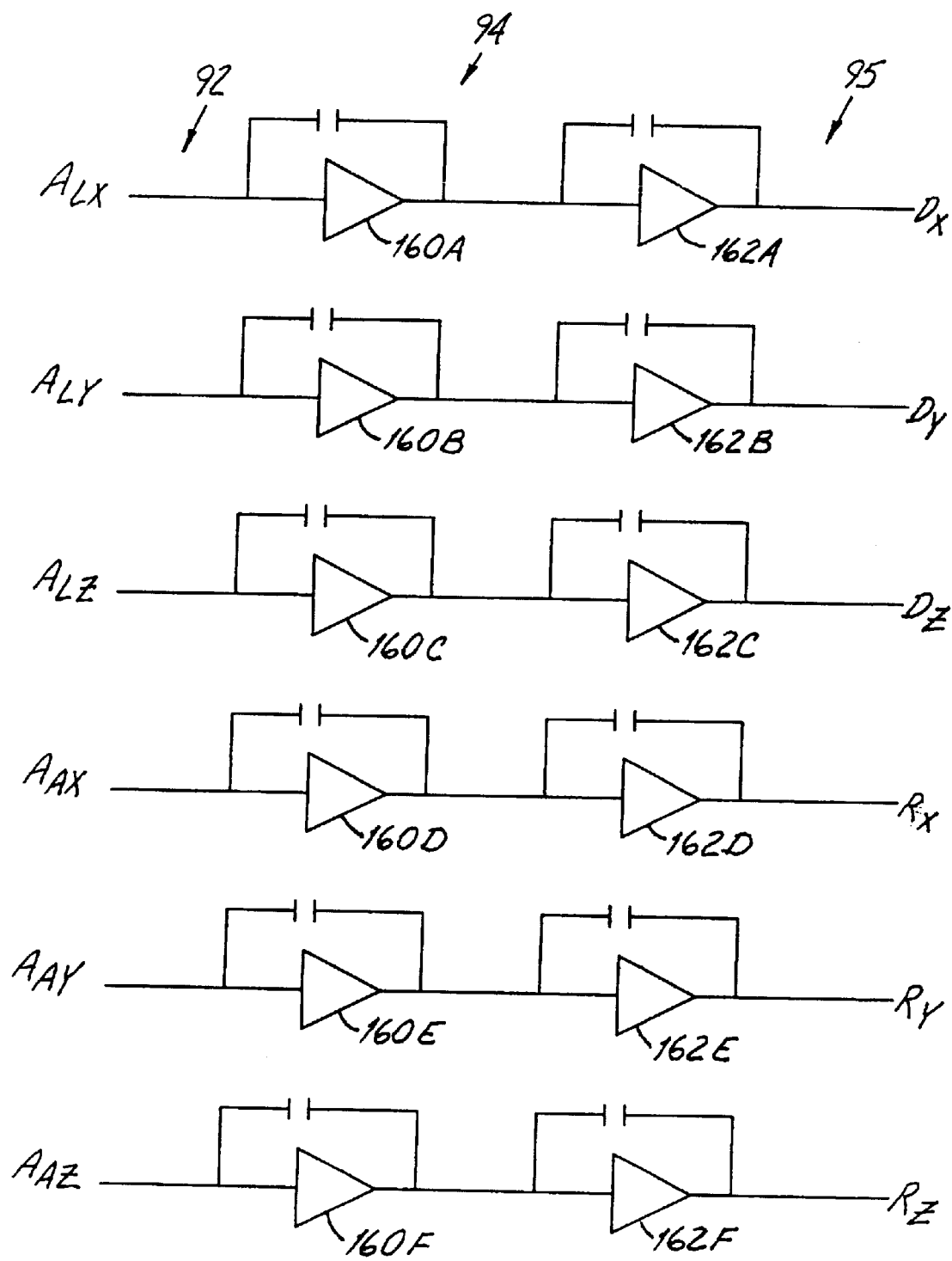
FIG. 5 is a block diagram of a calculation circuit.

FIG. 5 illustrates the calculation circuit 94 in detail. Signals 92 are received by the calculation circuit 94 and are sent through respective integration modules 160A–160F. The resulting signals are then sent through respective integration modules 162A–162F. In traversing the calculation circuit 94, the double integration of signals 92 is calculated in order to provide signals 95 indicative of displacement in six degrees of freedom.

Figure 6:
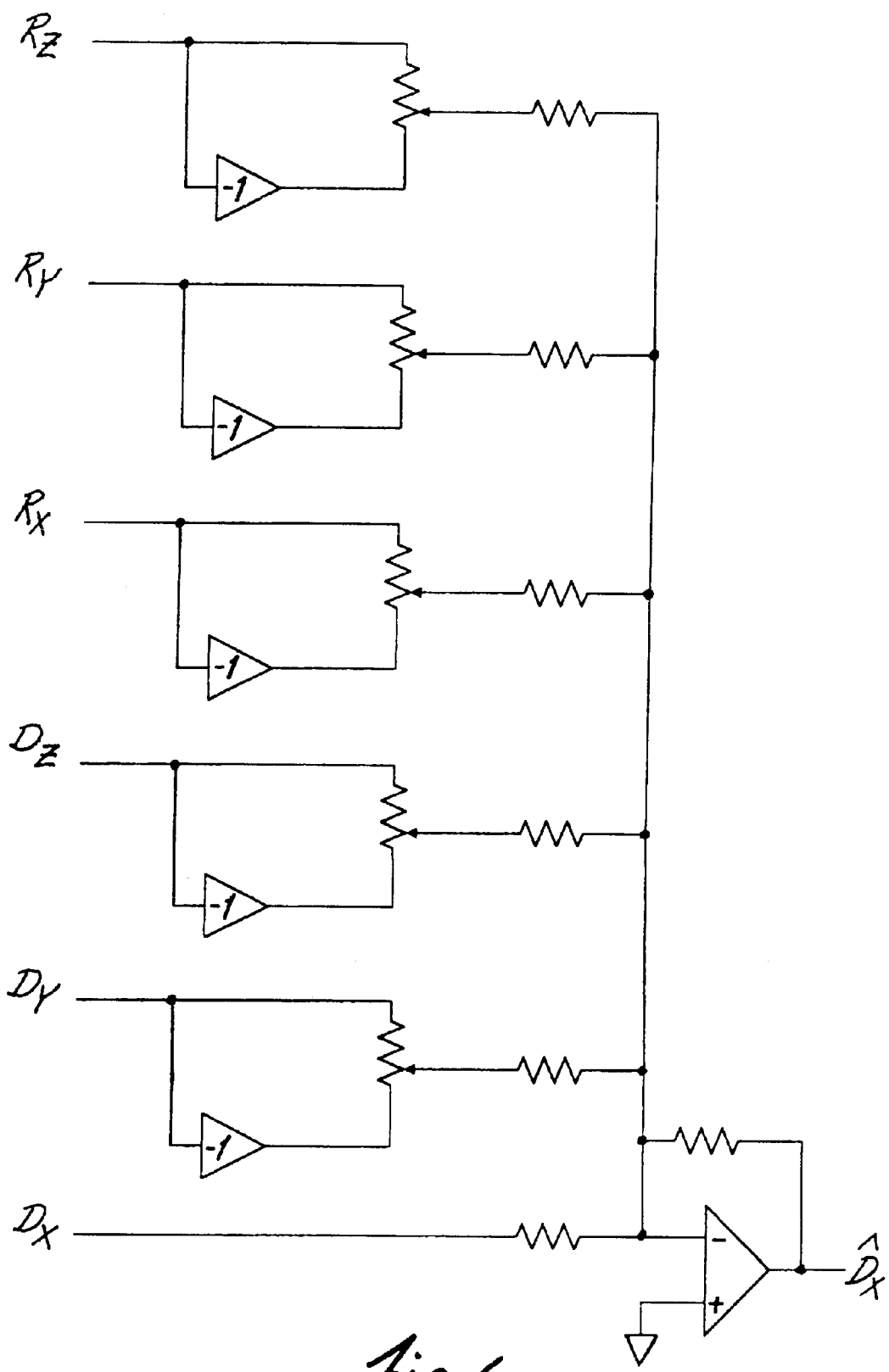
FIG. 6 is a circuit diagram of a portion of a cross coupling matrix circuit.

As stated above, cross-coupling compensation is provided by circuit 96. By way of example, FIG. 6 illustrates cross-coupling compensation for signal $D_X$ (linear displacement along X-axis) Each of the other output signals $D_Y$ (linear displacement along the Y-axis), $D_Z$ (linear displaced along the Z-axis), $R_X$ (rotational displacement about the X-axis), $R_Y$ (rotational displacement about the Y-axis) and $R_Z$ (rotational displacement about the Z-axis) are similarly compensated for cross-coupling affects.

Figure 7:
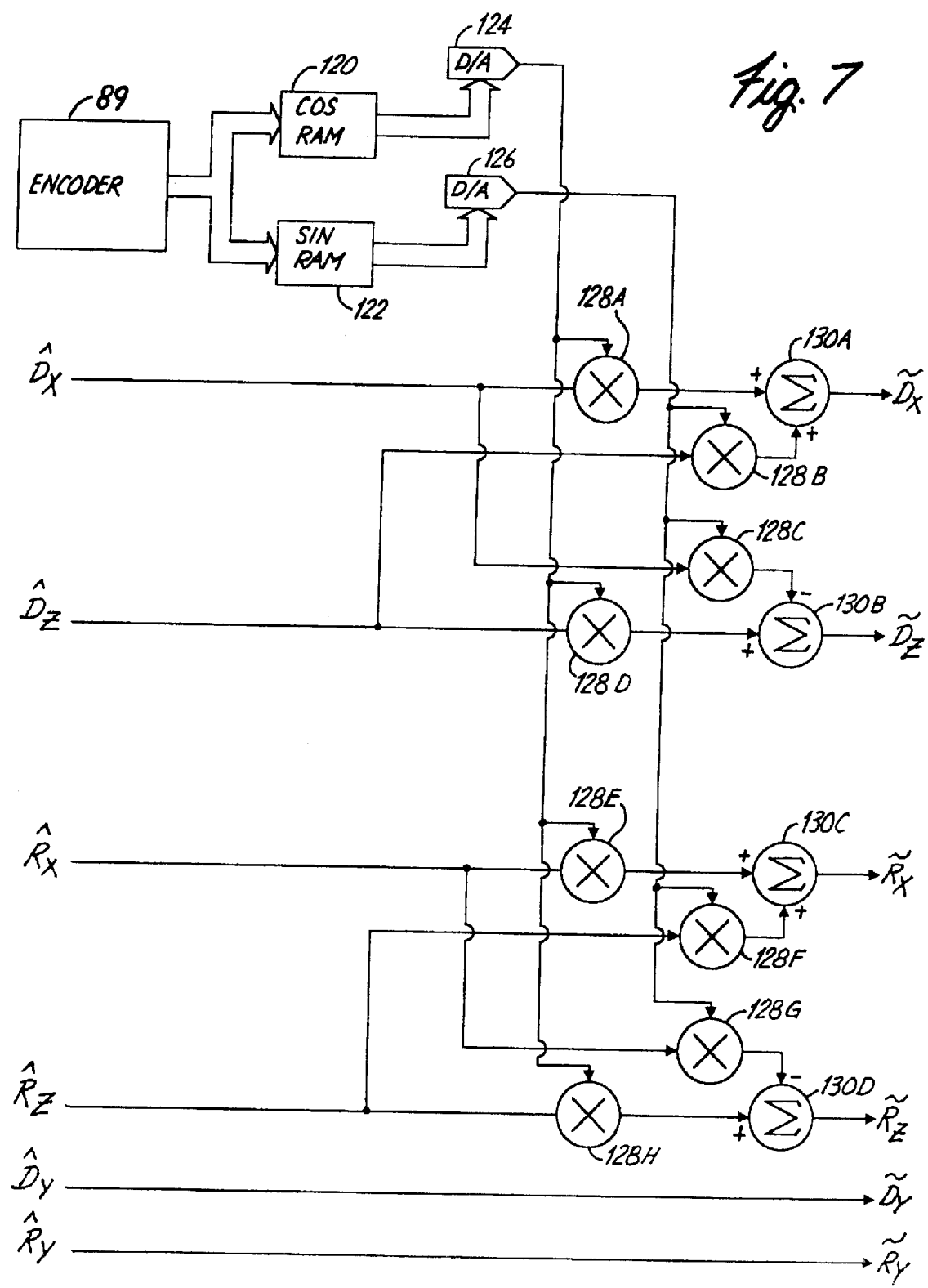
FIG. 7 is a block diagram of a coordinate transformation circuit.

FIG. 7 illustrates in detail the coordinate transformation circuit 102. The encoder 89 provides an index for sine and cosine digital values stored in suitable memory 120 and 122 such as RAM (random access memory). Digital to analog converters 124 and 126 receive the appropriate digital values and generate corresponding analog signals indicative of the angular position of body 11. Multipliers 128A–128H and adders 130A–130D combine displacement signals along and about the X-axis and the Z-axis so as to provide displacement signals 108 with respect to the static orthogonal coordinate system.

Figure 8:
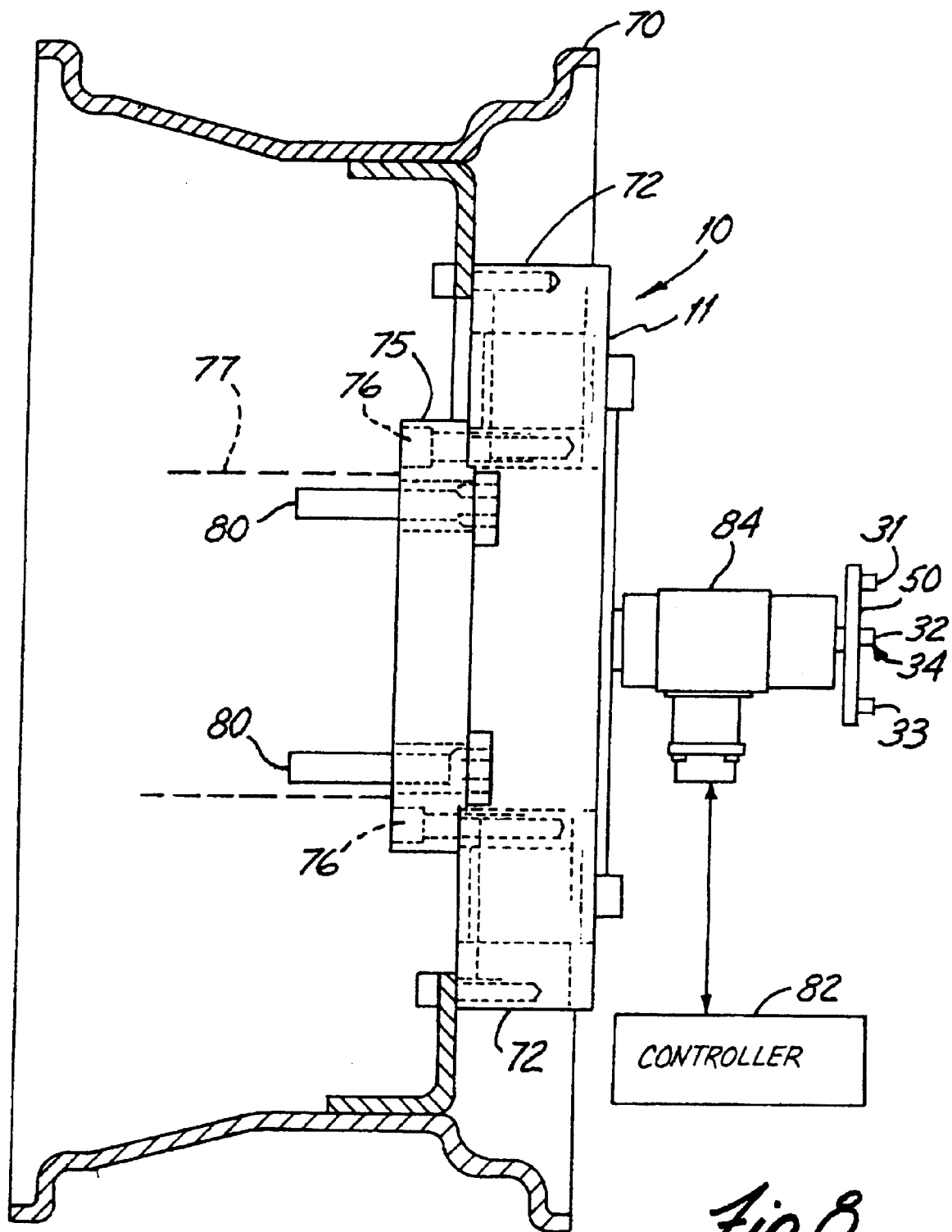
FIG. 8 is a side view of an alternative assembly mounted to a tire rim shown in section.

FIG. 8 illustrates an alternative embodiment of the present invention having body 11 mounted to tire rim 70. Reference numerals are similar to those illustrated in FIG. 2. In this embodiment, a support member 50 is coupled to transducer 10. Also, the body 11 rotates relative to support member 50 through a rotational coupling provided in slip ring assembly 84. In other words, the support member 50 does not rotate with the rim 70. Herein the support member 50 is mounted to the housing of the slip ring assembly 84, although other rotational couplings, such as bearings, etc. can be used. Pairs of accelerometers 31–34 are adapted to measure acceleration of vehicle spindle 77. Pairs 31–34 then provide acceleration signals to controller 82 to calculate displacement.

Figure 9:
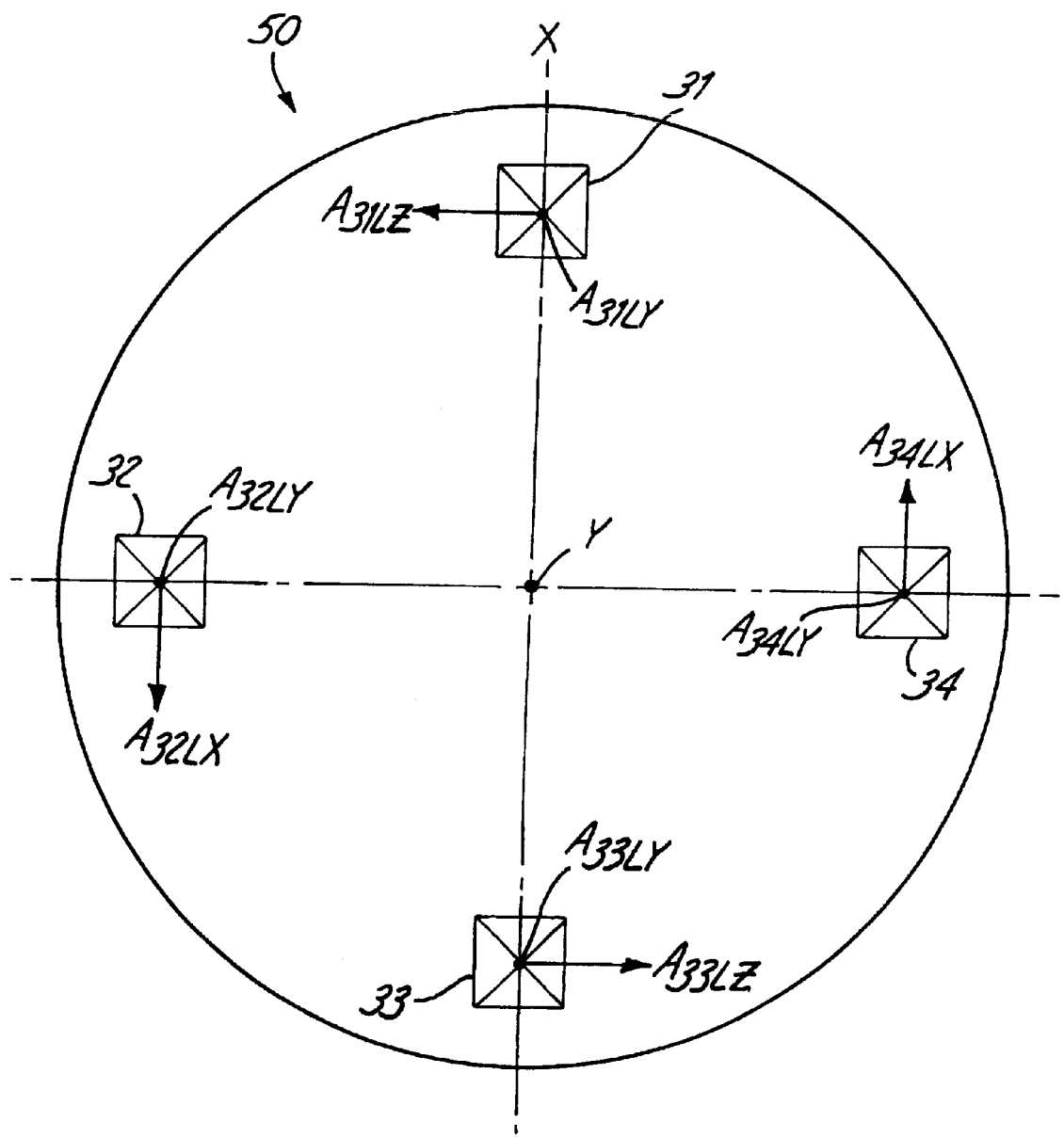
FIG. 9 is a top plan view of a support member coupled to the assembly.

Referring to FIG. 9, pairs 31–34 are mounted on support member 50 in order to measure acceleration of body 11 in six degrees of freedom. For example, pair 31 measures acceleration in a direction parallel to the Y-axis and in a direction parallel to the Z-axis. The values measured by pair 31 are represented as $A_{31LY}$ and $A_{31LZ}$. Other pairs 32–34 measure acceleration of the body 11 accordingly and in a manner similar to the previous embodiment. The circuit of FIG. 5 can be used to convert the acceleration signals from the accelerometers 31–34 although coordinate transformation block 102 is not required since body 11 does not rotate.

Figure 10:
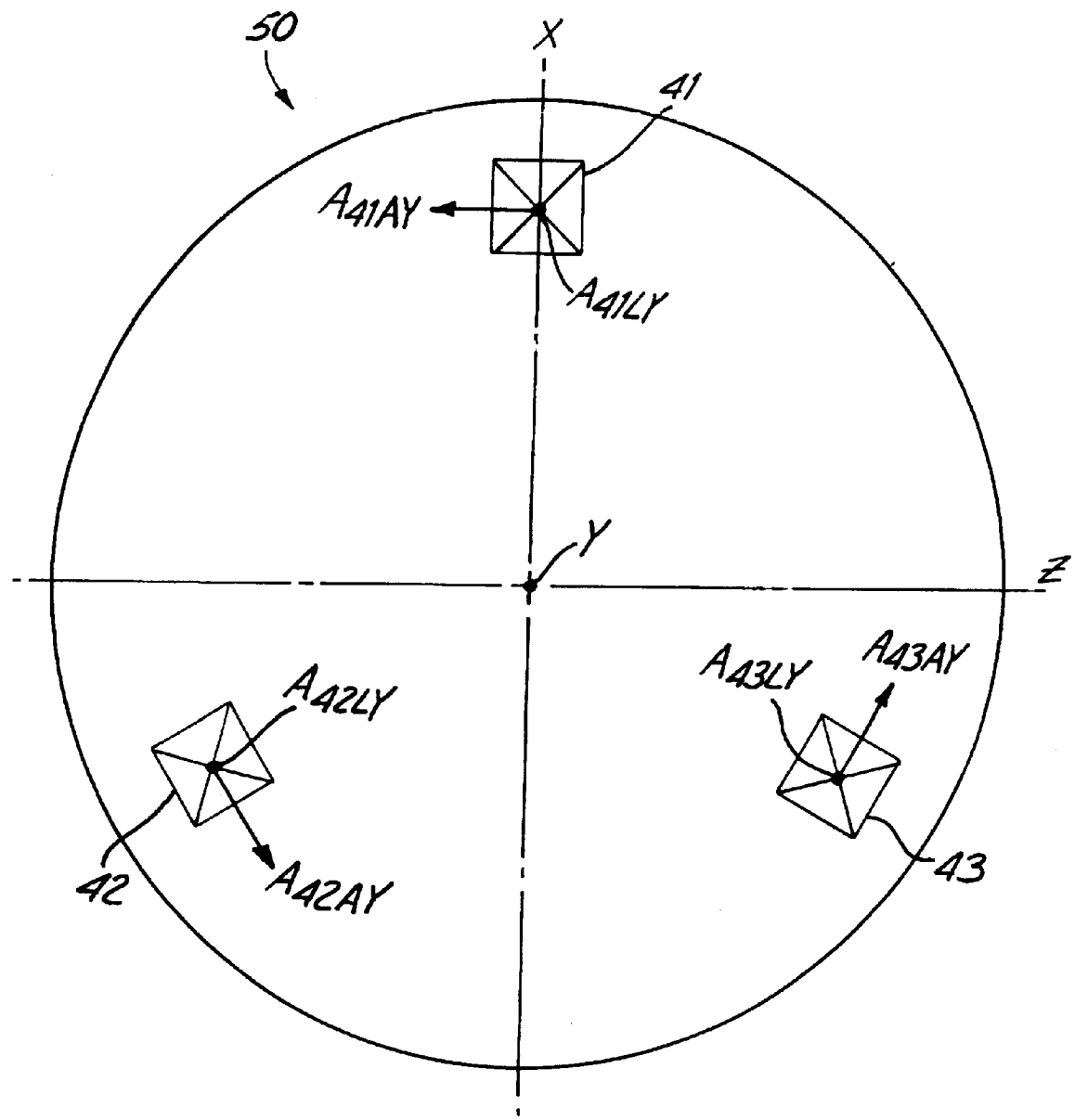
FIG. 10 is an alternative embodiment of a support member, coupled to the assembly.

FIG. 10 shows an alternative arrangement of accelerometers mounted on plate member 50. In this embodiment, three pairs of accelerometers 41–43 are used to measure the acceleration of body 11 in six degrees of freedom. For example, pair 41 measures acceleration parallel to the Y-axis (represented as value $A_{41LY}$) and also measures the angular acceleration of body 11 about the Y-axis (represented as value $A_{41AY}$). Pairs 42 and 43 measure acceleration components in a similar manner. The acceleration signals are then sent to controller 82. Those skilled in the art will appreciate that algebraic equations can be implemented combining signals from six accelerometers as illustrated in FIG. 10 to provide acceleration indications with respect to the orthogonal coordinate system. The accelerometers 41–43 can rotate with body 11 or remain relatively stationary with respect thereto.

Although the present invention has been described with reference to preferred embodiments, workers skilled in the art will recognize that changes may be made in form and detail without departing from the spirit and scope of the invention.

What is claimed is:

1. A spindle mountable transducer for measuring displacement of a vehicle spindle having an axis of rotation with respect to an orthogonal coordinate system, the transducer comprising:
   a body adapted to be mounted to the vehicle spindle to rotate therewith about the axis of rotation;
   a plurality of accelerometers coupled to the body and providing acceleration signals responsive to acceleration of the body; and
   a calculation circuit coupled to the plurality of accelerometers and adapted to convert the acceleration signals to displacement signals indicative of displacement of the body in the coordinate system.

2. The spindle mountable transducer of claim 1 wherein the plurality of accelerometers are mounted on the body to rotate therewith.

3. The spindle mountable transducer of claim 1 and further comprising:
   a member rotatably coupled to the body wherein the plurality of accelerometers are mounted to the member to remain stationary with respect to relative rotation of the body.

4. The spindle mountable transducer of claim 1 wherein the calculation circuit performs a double integral operation on the acceleration signals.

5. The spindle mountable transducer of claim 1 wherein the plurality of accelerometers are grouped in pairs of accelerometers, each pair comprising a first accelerometer sensing acceleration in a first direction, and a second accelerometer sensing acceleration in a second direction orthogonal to the first direction.

6. The spindle mountable transducer of claim 5 wherein the plurality of accelerometers comprises six accelerometers.

7. The spindle mountable transducer of claim 5 wherein the plurality of accelerometers comprises eight accelerometers.

8. The spindle mountable transducer of claim 1 wherein the plurality of accelerometers provide acceleration signals indicative of six degrees of freedom.

9. A method for measuring displacement of a vehicle spindle having an axis of rotation with respect to an orthogonal coordinate system, the method comprising:
   mounting a body to the vehicle spindle to rotate therewith about the axis of rotation;
   measuring acceleration of the body and providing an acceleration signal responsive to the measured acceleration; and
   calculating displacement of the body in the coordinate system depending on the measured acceleration.

10. The method of claim 9 wherein the step of calculating comprises performing a double integral operation on the acceleration signal.

11. The method of claim 9 wherein measuring acceleration comprises mounting a plurality of accelerometers to the body to rotate therewith, and wherein the method further comprises measuring an angular position of the body about an axis of rotation, and wherein calculating displacement of the body is a function of the angular position.

12. The method of claim 9 wherein measuring acceleration comprises mounting accelerometers to a member that is relatively stationary in the coordinate system as the body rotates, the member being rotatably coupled to the body.

* * * * *